United States Patent
Rigaud (10) Patent No.: US 10,408,479 B2
(45) Date of Patent: Sep. 10, 2019

(54) DUAL-FLOW AIR/AIR EXCHANGER, APPARATUS FOR PROCESSING AIR AND METHOD FOR PROTECTING SUCH AN EXCHANGER AGAINST ICE AND FOR CLEANING SAME

(71) Applicant: ELYT 3, Beligneux (FR)

(72) Inventor: Franck Rigaud, Reyrieux (FR)

(73) Assignee: F2A-FABRICATION AERAULIQUE ET ACOUSTIQUE, Beligneux (FR)

( * ) Notice: Subject to any disclaimer, the term of this patent is extended or adjusted under 35 U.S.C. 154(b) by 136 days.

(21) Appl. No.: 15/039,528

(22) PCT Filed: Nov. 28, 2014

(86) PCT No.: PCT/EP2014/076017
§ 371 (c)(1),
(2) Date: May 26, 2016

(87) PCT Pub. No.: WO2015/079046
PCT Pub. Date: Jun. 4, 2015

(65) Prior Publication Data
US 2016/0377304 A1    Dec. 29, 2016

(30) Foreign Application Priority Data
Nov. 28, 2013    (FR) ..................... 13 61798

(51) Int. Cl.
*F28F 27/02*    (2006.01)
*G05D 15/00*    (2006.01)
(Continued)

(52) U.S. Cl.
CPC .............. *F24F 7/08* (2013.01); *F28D 9/0025* (2013.01); *F28D 9/0031* (2013.01);
(Continued)

(58) Field of Classification Search
CPC ..... F24F 7/08; F24F 2007/005; F28D 9/0025; F28D 9/0031; F28F 19/006; F28F 27/02;
(Continued)

(56) References Cited

U.S. PATENT DOCUMENTS 1,409,520 A     3/1922  Bird
4,102,393 A  *  7/1978  Withers, Jr. .............. F28F 1/42
                                                         165/174
(Continued)

FOREIGN PATENT DOCUMENTS

CA    2 509 571 A1    12/2006
CN    102150003 A      8/2011
(Continued)

OTHER PUBLICATIONS

International Search Report, dated Feb. 13, 2015, from corresponding PCT application.
(Continued)

*Primary Examiner* — Jason N Thompson
(74) *Attorney, Agent, or Firm* — Young & Thompson (57) ABSTRACT

This counter-current dual-flow air/air exchanger (1) includes a first network of channels oriented along a longitudinal axis (X-X') of the exchanger (1), suitable for the circulation of a first airflow (F1) in a first direction, and a second network of channels oriented along the longitudinal axis (X-X') of the exchanger (1), suitable for the circulation of a second airflow (F2) in the direction opposite the first airflow (F1). The exchanger (1) includes members (10, 12, 14) for reversing the flow direction of the second airflow (F2) in the second network of channels, such that the first and second airflows (F1, F2) circulate co-currently, suitable for protecting the exchanger (1) from ice.

13 Claims, 7 Drawing Sheets

(51) Int. Cl.
*F24F 7/08* (2006.01)
*F28F 19/00* (2006.01)
*F28D 9/00* (2006.01)
*F24F 12/00* (2006.01)
*F24F 11/41* (2018.01)

(52) U.S. Cl.
CPC ............ *F28F 19/006* (2013.01); *F28F 27/02* (2013.01); *F24F 11/41* (2018.01); *F24F 2012/007* (2013.01); *F28F 2250/06* (2013.01); *Y02B 30/563* (2013.01)

(58) Field of Classification Search
CPC ............ F28F 2250/10; F28F 2250/108; F28F 2250/102
USPC .................. 165/282, 283, 97, 103, 165, 166
See application file for complete search history.

(56) References Cited

U.S. PATENT DOCUMENTS

| | | | | |
|---|---|---|---|---|
| 4,460,388 | A * | 7/1984 | Fukami | ................... F24F 13/30 165/166 |
| 6,408,941 | B1 * | 6/2002 | Zuo | ...................... F28D 9/0025 165/164 |
| 7,644,754 | B2 | 1/2010 | Veltkamp et al. | |
| 9,677,831 | B2 | 6/2017 | Martin et al. | |
| 2004/0251012 | A1 * | 12/2004 | Bush | ........................ B60H 1/18 165/81 |
| 2005/0236136 | A1 * | 10/2005 | Veltkamp | .............. F24F 12/001 165/4 |
| 2007/0084586 | A1 | 4/2007 | Poirier | |
| 2007/0261837 | A1 * | 11/2007 | Valensa | ................. F28D 9/0025 165/185 |
| 2009/0314480 | A1 * | 12/2009 | Grinbergs | .............. F24F 3/1411 165/174 |
| 2010/0101764 | A1 * | 4/2010 | Yang | ...................... F24F 3/1411 165/104.31 |
| 2011/0186275 | A1 | 8/2011 | Jekerle et al. | |
| 2012/0085517 | A1 * | 4/2012 | Martin | ...................... F22B 1/18 165/96 |
| 2012/0087086 | A1 | 4/2012 | Kok et al. | |

FOREIGN PATENT DOCUMENTS

| | | |
|---|---|---|
| CN | 103119280 A | 5/2013 |
| DE | 202 09 031 U1 | 8/2002 |
| DE | 202007012261 U1 | 11/2007 |
| DE | 1 2008 048405 B3 | 4/2010 |
| EP | 2 597 388 A2 | 5/2013 |
| FR | 2 874 421 A1 | 2/2006 |
| FR | 2961891 A1 | 12/2011 |
| FR | 2 983 284 A1 | 5/2013 |
| JP | S60-106038 | 7/1985 |
| JP | H01-106844 | 7/1989 |
| JP | 2001241719 A | 9/2001 |
| JP | 2004124808 A | 4/2004 |
| JP | 2005-520119 | 7/2005 |
| JP | 1688804 A | 10/2005 |
| JP | 2012-032134 | 2/2012 |
| JP | 2012-083095 | 4/2012 |
| JP | 2012-127601 | 7/2012 |
| JP | 2012-189252 | 10/2012 |
| JP | 2012-189290 | 10/2012 |
| JP | 2013-217542 | 10/2013 |
| WO | 80/02064 A1 | 10/1980 |
| WO | 2010/074641 A1 | 7/2010 |
| WO | 2011161360 A2 | 12/2011 |
| WO | 2013091099 A1 | 6/2013 |

OTHER PUBLICATIONS

FR Search Report, dated Jul. 7, 2014, from corresponding FR application.

* cited by examiner

DUAL-FLOW AIR/AIR EXCHANGER, APPARATUS FOR PROCESSING AIR AND METHOD FOR PROTECTING SUCH AN EXCHANGER AGAINST ICE AND FOR CLEANING SAME

The invention relates to a counter-current dual-flow air/air exchanger, as well as an air treatment apparatus comprising such an exchanger. The invention also relates to a method for protecting against ice and for cleaning such an exchanger.

In the field of dual-flow air/air heat exchangers, in particular for ventilation and air treatment apparatuses for service sector or residential premises, it is in particular known from FR-A-2,961,891, to use counter-current cellular exchangers (or "methodical" operation) implementing a network of channels distributed in plates in which a flow of air circulates in the longitudinal direction of the exchanger in a first direction. A second flow of air, with which the heat exchanges take place, circulates between the plates in the longitudinal direction of the exchanger and in the direction opposite the first flow of air. Such a technology allows high-performance heat exchanges.

Such exchanges have the drawback of being sensitive to ice, which causes major pressure drops, a malfunction, a decrease and/or stop in airflow rates no longer performing the primary ventilation and air treatment function, or even deterioration. To avoid ice in the exchanger, it is known to use electric heating elements to deice it, or to prevent the appearance of ice, or to implement an "all or nothing" control making it possible to completely stop the heat exchanges in the exchanger temporarily. Such techniques have the drawback of generating energy losses due to the non-recovery of the heat, or an excess energy due to the auxiliary heating required by the deicing.

The invention aims to resolve these drawbacks by proposing a new counter-current air/air exchanger whereof the structure allows more effective deicing management and that offers greater control possibilities.

To that end, the invention relates to a counter-current dual-flow air/air exchanger including a first network of channels oriented along a longitudinal axis of the exchanger, suitable for the circulation of a first airflow in a first direction, and a second network of channels oriented along the longitudinal axis of the exchanger, suitable for the circulation of a second airflow in the direction opposite the first airflow. This exchanger is characterized in that it comprises means for reversing the flow direction of the second airflow in the second network of channels, such that the first and second airflows circulate co-currently, said members being suitable for protecting the exchanger from ice.

Owing to the invention, the operation of the exchanger may be modified so as to work in co-current (or "anti-methodical" operation), i.e., the heat exchanges take place between two airflows circulating in the same direction. As a result, the hot source enters from the same side as the cold source; the temperature profiles are therefore modified as a result, which results in an output temperature of the cold fluid lower than the output temperature of the hot fluid. The formation of ice in the exchanger is therefore avoided. However, the heat exchanges are still active, which makes it possible to prevent the total loss of heat energy contained in the hottest airflow, in particular in case of an airflow extracted from a room of a heated premises.

According to advantageous but optional aspects of the invention, such an exchanger may also incorporate one or more of the following features, considered in any technically allowable combination:

The exchanger comprises an inlet opening for the second airflow situated on a first side of one face of the exchanger and an outlet opening situated on a side of said face of the exchanger opposite the first side.

The reversing members for the flow direction of the second airflow in the second network of channels comprise:

a first bypass compartment, not comprising any heat exchange surface with the first network of channels, and fluidly connecting an inlet opening of the second airflow and a first outlet opening of the second airflow, able to be used in a bypass configuration of the exchanger, a flow steering member suitable for selectively steering the second airflow toward the second network of channels or toward the first bypass compartment, and means for closing off the first outlet opening of the second airflow such that the second airflow passes in the second network of channels after its passage in the first bypass compartment.

The means for closing off the first outlet opening of the second airflow comprise a flap mounted pivoting relative to a face of the exchanger in which the first outlet opening is arranged.

The steering member for the second airflow is suitable, when it steers the second airflow toward the second network of channels, for preventing the passage of the second airflow in the first bypass compartment.

The exchanger comprises a second bypass compartment including an inlet fluidly communicating with the second network of channels on the side of the inlet opening of the second airflow, and an outlet, forming a second outlet opening of the second airflow, near the first outlet opening of the second airflow.

The exchanger comprises a flap closing for off the second outlet opening of the second airflow.

The steering member of the second airflow is suitable, when it steers the second airflow toward the first bypass compartment, for steering the second airflow toward the second bypass compartment after the passage of the second airflow in the second network of channels, to prevent the second airflow leaving the second network of channels from leaving the exchanger through the inlet opening for the second airflow.

The flow steering member comprises separating means that prevent the passage of the second airflow in the first bypass compartment when the flow steering member steers the second airflow toward the second network of channels.

The flow steering member is a valve rotatable along an axis perpendicular to the longitudinal axis of the exchanger.

The exchanger comprises a central block including an exchange compartment in which the first and second networks of channels are mounted, the central block comprising inlet and outlet openings for the second airflow in the central block situated upstream from the exchange compartment relative to the circulation direction of the first airflow in the exchange compartment, and inlet and outlet openings for the second airflow in the central block situated downstream from the exchange compartment relative to the circulation direction of the first airflow in the exchange compartment, and the members reversing the flow direction of the second airflow are suitable for opening the inlet opening situated upstream and the outlet opening situated downstream such that the first and second airflows circulate co-currently.

The reversing members are translatable flaps suitable for closing off and opening, selectively, the inlet and outlet openings of the second airflow in the central block.

The invention also relates to an air treatment apparatus comprising an exchanger as mentioned above, the second airflow being an airflow taken from a premises.

The invention also relates to a method for protecting against ice and cleaning an exchanger as mentioned above, characterized in that it comprises a step consisting of cleaning the network of channels in which the airflow most charged with particles flows and reversing this airflow such that it flows in the same direction as the airflow least charged with particles.

The invention will be better understood and other advantages thereof will appear more clearly in light of the following description of an exchanger and an air treatment apparatus according to its principle, done as a non-limiting example in reference to the appended drawings, in which.

Figure 1:
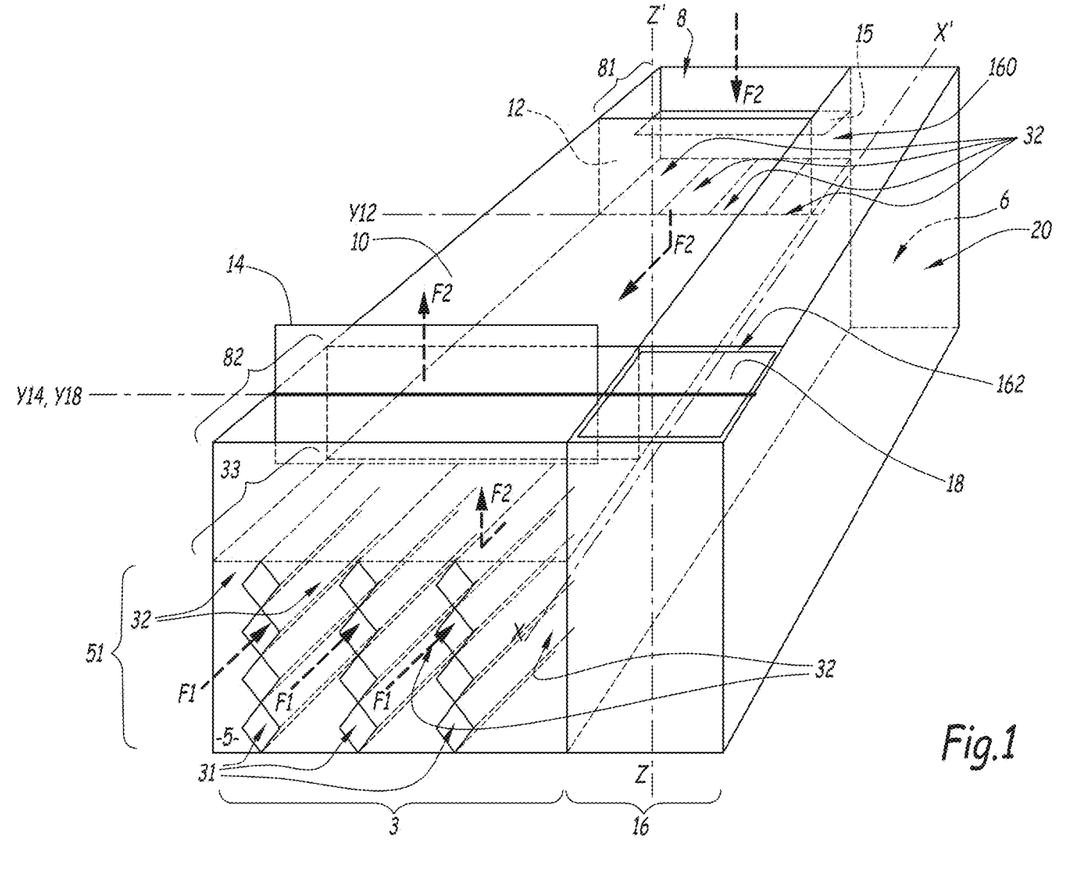
FIGS. 1, 2 and 3 are diagrammatic perspective views of an exchanger according to a first embodiment of the invention, in a first, second and third operating configuration.
Figure 2:
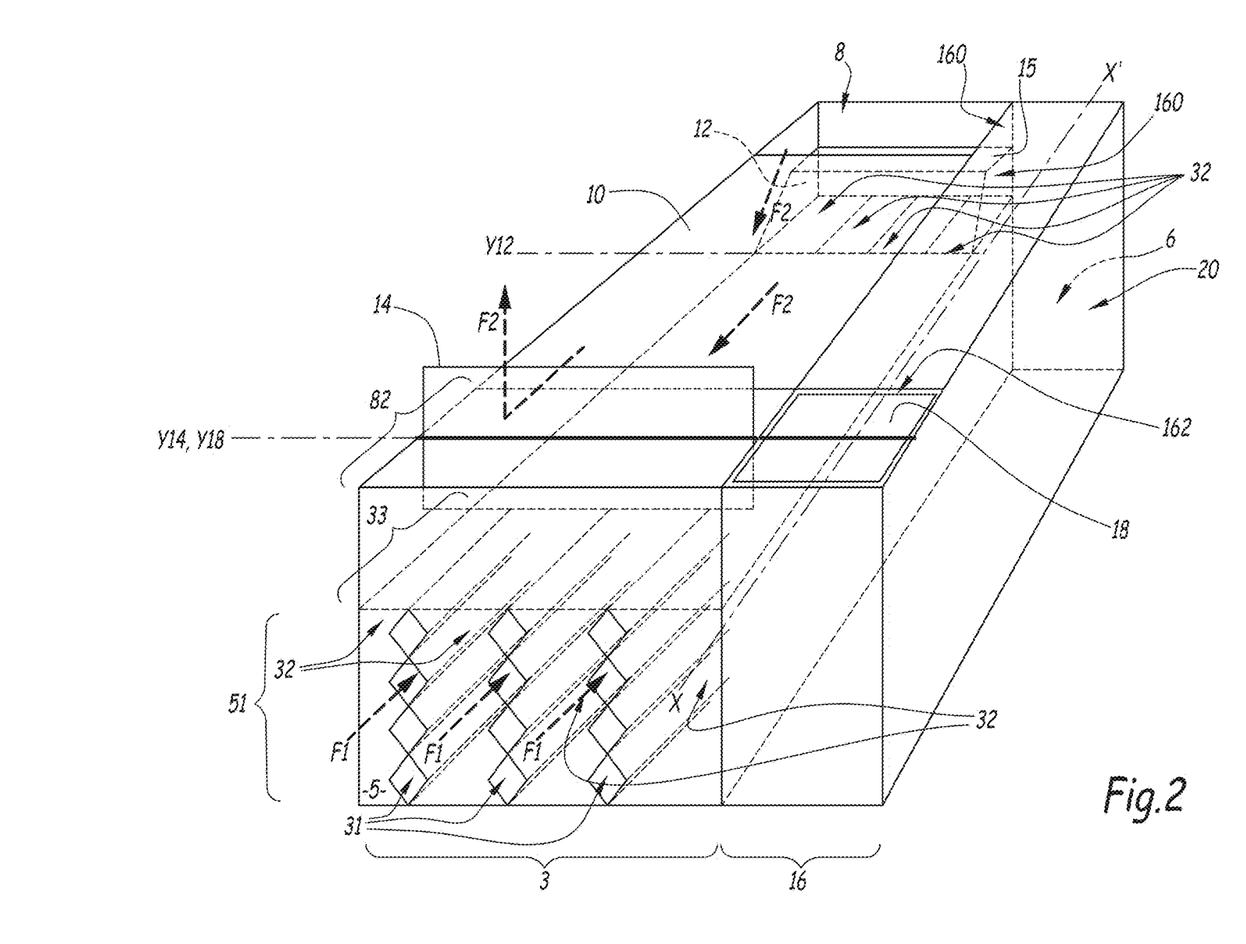
Figure 3:
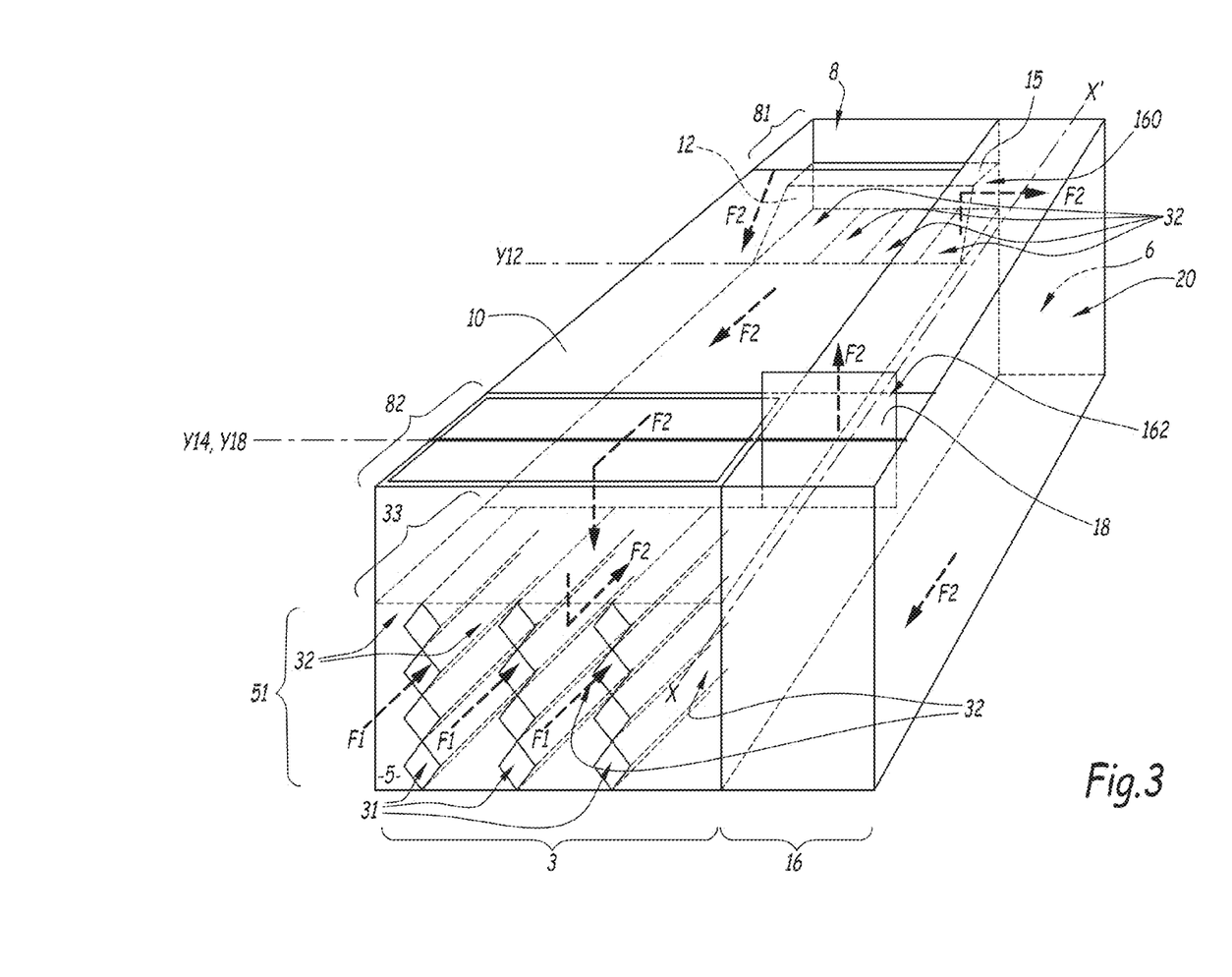

FIGS. 1 to 3 show a counter-current dual-flow exchanger 1. The exchanger 1 includes an exchange compartment 3 that includes a first network of channels 31 and a second network of channels 32 oriented along a longitudinal axis X-X' of the exchanger 1. A first airflow F1 circulates in the network of channels 31 between an inlet opening 51 arranged in a side face 5 of the exchanger 1 and an outlet opening, not shown, arranged in an opposite side face 6 of the exchanger 1 along the axis X-X' at the side face 5. In a known manner, the first network of channels 31 is formed from a plurality of channel columns superimposed on one another. Alternatively, the channels of the first network of channels 31 can be grouped together horizontally in rows. The channels of the first network of channels 31 preferably have a cross-section in the shape of a parallelogram, preferably a diamond.

A second airflow F2 circulates in the second network channels 32. Optionally, the second airflow F2 enters the exchanger 1 through an inlet opening 81 of an upper face 8 of the exchanger 1 situated on the side of the side face 6, and leave it through an outlet opening 82 of the upper face 8 situated on the side of the side face 5. The second network of channels 32 is formed by spaces defined by the columns of channels of the first network of channels 31. Near the faces 5 and 6, the compartment comprises openings 33 that respectively emerge across from the outlet 82 and inlet 81 openings of the second airflow F2, such that the second airflow F2 enters and leaves the exchange compartment 3 and the exchanger 1 parallel to an axis Z-Z' perpendicular to the upper face 8.

The channels 31 and 32 are placed so as to allow heat exchanges between the first airflow F1 and the second airflow F2. In a normal operating configuration of the exchanger 1 shown in FIG. 1, the second airflow F2 circulates, between the inlet opening 81 and the outlet opening 82, in a direction opposite the first airflow F1, in order to obtain counter-current heat exchanges.

In order to avoid icing of the exchanger 1, the exchanger 1 comprises means for reversing the flow direction of the second airflow F2 in the second network of channels 32 suitable for protecting the exchanger 1 from ice. To that end, the exchanger 1 comprises a first bypass compartment 10 that fluidly connects the inlet opening 81 to the outlet opening 82 and does not comprise any heat exchange surface with the first network of channels 31. In other words, the first bypass compartment 10 constitutes a "bypass" means of the exchanger 1, making it possible to eliminate the heat exchanges between the airflow F1 and the second airflow F2.

The first bypass compartment 10 fluidly communicates with the second network of channels 32 on the side of the outlet opening 82, such that, near the side face 5, the first bypass compartment 10 is able to communicate fluidly both with the outside of the exchanger 1 through the outlet opening 82, and with the second network of channels 32 through the openings 33.

The inlet opening 81 of the second airflow F2 communicates simultaneously with the second network of channels 32 on the side of the side face 6 and with the first bypass compartment 10. The exchanger 1 comprises a flow steering member, formed by a flap 12, suitable for selectively steering the second airflow F2, formed by the air entering the exchanger 1 through the inlet opening 81, either toward the second network of channels 32, as shown in FIG. 1 in a normal configuration of the exchanger 1, or toward the first bypass compartment 10, as shown in FIGS. 2 and 3. The flap 12 is mounted pivoting along an axis Y12 perpendicular to the axis X-X'.

The exchanger 1 also comprises means for closing off the outlet opening 82 of the second airflow F2. These closing off means comprise a flap 14 mounted pivoting relative to the upper wall 8 of the exchanger 1 along an axis Y14 perpendicular to the axis X-X'.

In the normal operating configuration of the exchanger 1 shown in FIG. 1, the flap 12 is in a first vertical position and closes off the bypass compartment 10. The airflow F2 enters the exchanger 1 through the inlet opening 81, passes through the second network of channels 32 and leaves the exchanger 1 through the outlet opening 82. The exchanger 1 can operate in a "bypass" mode shown in FIG. 2, in which the flap 12 is in a second inclined position in which it steers the second airflow F2 toward the bypass compartment 10. In this case, the flap 12 is joined with an intermediate partition 15 perpendicular to the side face 6 and closes off the access to the second network of channels. The second airflow F2 therefore does not pass in the second network of channels 32 and leaves directly from the exchanger 1 through the outlet opening 82, the flap 14 being open. In this way, no heat exchange takes place in the exchanger 1.

In a third operating mode shown in FIG. 3, the risks of icing of the exchanger 1 are reduced, while maintaining the heat exchanges between the airflows F1 and F2. In this configuration, the flap 12 is in its second position so as to steer the second airflow F2 toward the first bypass compartment 10. In this configuration, the flap 14 is closed such that at the outlet of the first bypass compartment 10 on the side of the side face 5, the second airflow F2 is oriented toward the second network of channels 32, which fluidly communicates with the first bypass compartment 10. The second airflow F2 therefore uses the second network of channels 32 in the direction opposite that of the first embodiment shown in FIG. 1, i.e., flowing parallel to the axis X-X', in a direction going from the side face 5 toward the side face 6, like the first airflow F1. Heat exchanges between the first and second airflows therefore take place in the same direction along the axis X-X'. Using the first airflow F1 as cold source and the second airflow F2 as hot source, one obtains an operation in which the hot source enters from the same side as the cold source. The outlet temperature of the cold fluid is therefore lower than the outlet temperature of the hot fluid, which makes it possible to avoid icing of the exchanger 1. The members for reversing the circulation direction of the second airflow F2 in the second network of channels are therefore suitable for protecting the exchanger 1 from ice.

To discharge the second airflow F2 at the outlet of the second network of channels 32 on the side of the side face 6, the exchanger 1 comprises a second bypass compartment 16, advantageously placed along a longitudinal face 20 of the exchanger 1, which forms a discharge conduit for the second airflow F2.

The second bypass compartment 16 includes an inlet 160, formed by a space comprised [between] the opening 33 on the side of the face 6 and the intermediate partition 15, fluidly communicating with the second network of channels 32 on the side of the inlet opening 81. The second bypass compartment 16 is provided with an outlet forming a second outlet opening 162 of the second airflow F2 arranged near the outlet opening 82 on the side of the side face 5. The second outlet opening 162 is concealed, in the configuration of FIGS. 1 and 2, by a flap 18 pivoting along an axis Y18 perpendicular to the axis X-X'.

The axes Y14 and Y18 are shown in the figures as being combined, the flaps 14 and 18 being able to be maneuvered at the same time. Alternatively, the flaps 14 and 18 can be maneuverable separately along separate axis Y14 and Y18.

In the third operating mode, when the second airflow F2 leaves the second network of channels 32 on the side of the inlet opening 81, the flap 12 orients the second airflow F2 toward the inlet 160. The second airflow F2 is prevented from leaving through the inlet opening 81 via the flap 12 and the intermediate partition 15. The second airflow F2 follows a trajectory perpendicular to the axis X-X', as shown in FIG. 3, toward the second bypass compartment 16.

The exchanger 1 is integrated with an air treatment apparatus and the second airflow F2 is an airflow taken from a premises. The second airflow has a temperature greater than the temperature of the first airflow F1. In the bypass configuration of the exchanger 1, the extracted airflow naturally being more charged with particles is deviated in the bypass compartment 10, which makes it possible to avoid dirtying the second network of channels 32.

During the passage from the counter-current operating mode to the co-current mode, the reversal of the flow direction of the extract airflow F2 most charged with particles allows cleaning of the surface layers of particles that may have been deposited on the surface of the second network of channels 32, the extracted airflow generally being more polluted and less filtered. The reversal of the circulation direction of the second airflow therefore allows an optimal operation of the exchanger 1 over time.

Figure 4:
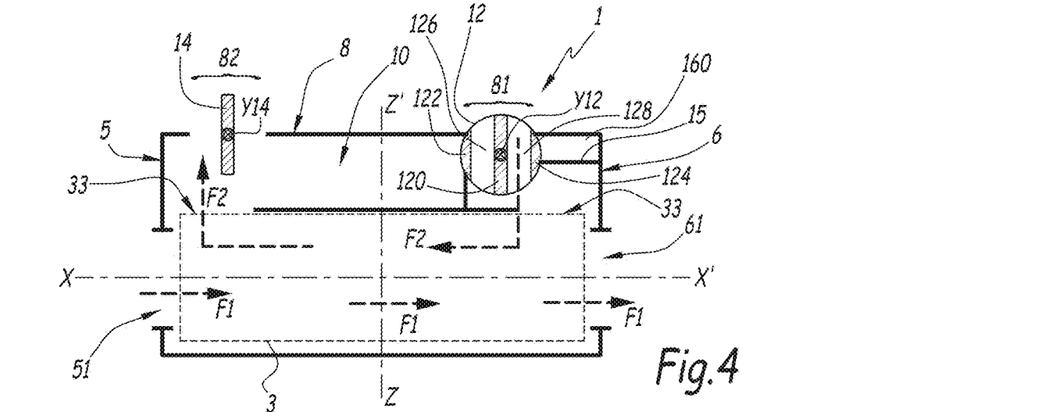
FIGS. 4, 5 and 6 are side views on a scale smaller than that of FIGS. 1 to 3, of an exchanger according to a second embodiment of the invention, in the first, second and third operating configurations.
Figure 5:
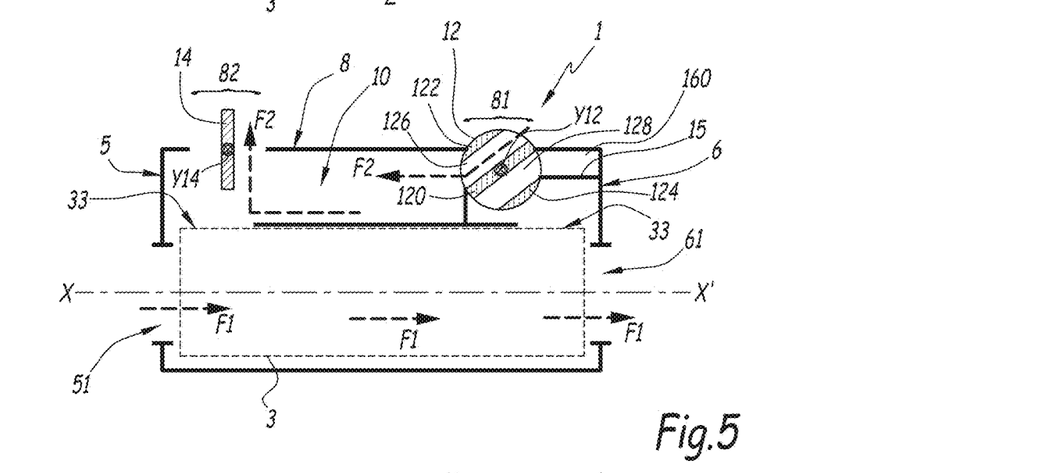
Figure 6:
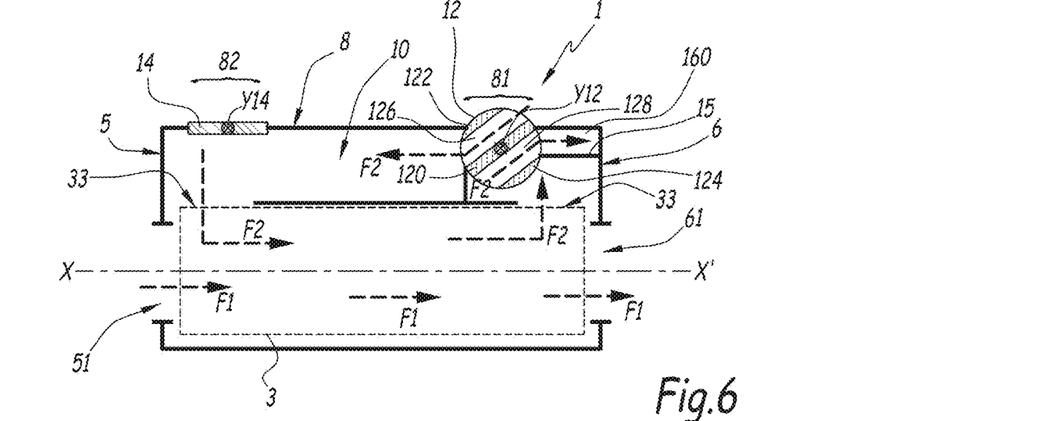

Second and third embodiments of the invention are respectively shown in FIGS. 4, 5 and 6 and in FIGS. 7 to 11. In these embodiments, the elements similar to the first embodiment bear the same references and operate in the same manner. Only the differences with respect to the first embodiment are outlined below.

In the embodiment of FIGS. 4 to 6, the flow steering member is formed by a circular valve 12. The valve 12 is mounted pivoting along an axis Y12 perpendicular to the axis X-X' and comprises a central wall 120. The valve 12 comprises a separating wall 122 that defines, with the central wall 120, a first channel 126. The valve 12 also comprises a separating wall 124, opposite the wall 122 relative to the axis Y12, that defines a second channel 128 with the central wall 120. The channels 126 and 128 are able to steer the second airflow F2 either toward the second network of channels or toward the bypass compartment 10.

In FIGS. 4, 5 and 6, the airflows F1 and F2 are shown as circulating in the same plane. In reality, the airflows F1 and F2 circulate in offset planes. The first airflow leaves the side face 6 by an opening 61. Furthermore, in this embodiment, the exchanger 1 includes a bypass compartment 16 similar to that of the first embodiment and that is not shown in light of the orientation of FIGS. 4, 5 and 6.

In the normal configuration shown in FIG. 4, the valve 12 is in a first position in which the channels 126 and 128 steer the second airflow F2 toward the second network of channels 32, and the flap 14 is open so that the airflow F2 can be discharged from the exchanger 1.

In the configuration of FIG. 4, the separating wall 122 closes the first bypass compartment 10 such that the second airflow cannot flow toward the compartment 10, and the separating wall 124 closes the opening of the second bypass compartment 16.

In the configuration of FIGS. 5 and 6, the first channel 126 steers the second airflow F2 toward the first bypass compartment 10.

In this embodiment, the opening 160 is situated against the upper wall 8 and the intermediate partition 15.

In the configuration of FIG. 6, when the second airflow F2 leaves the second network of channels 32 near the inlet opening 81, the second channel 128 of the valve 12 prevents the second airflow F2 from leaving the exchanger 1 and steers the second airflow F2 toward the opening 160 of the second bypass compartment 16, such that it is discharged from the exchanger 1 by the second outlet opening 162, which in this case is made usable by opening the flap 18.

An exchanger 200 according to a third embodiment is shown in FIGS. 7 to 11. In this embodiment, the exchanger does not comprise an inlet opening for the second airflow F2 situated on a first side of a face of the exchanger and an outlet opening situated on a side of said face opposite the first side. The exchanger 200 comprises two opposite side faces 202 and 204, as well as an upper face 206 and a lower face 208. The side face 202 comprises an inlet opening 202a for the first airflow F1 in the exchanger 1 and an outlet opening for the second airflow F2 of the exchanger 1. The side face 204 comprises an inlet opening 204a of the second airflow F2 and an outlet opening 204b for the first airflow F1.

Figure 11:
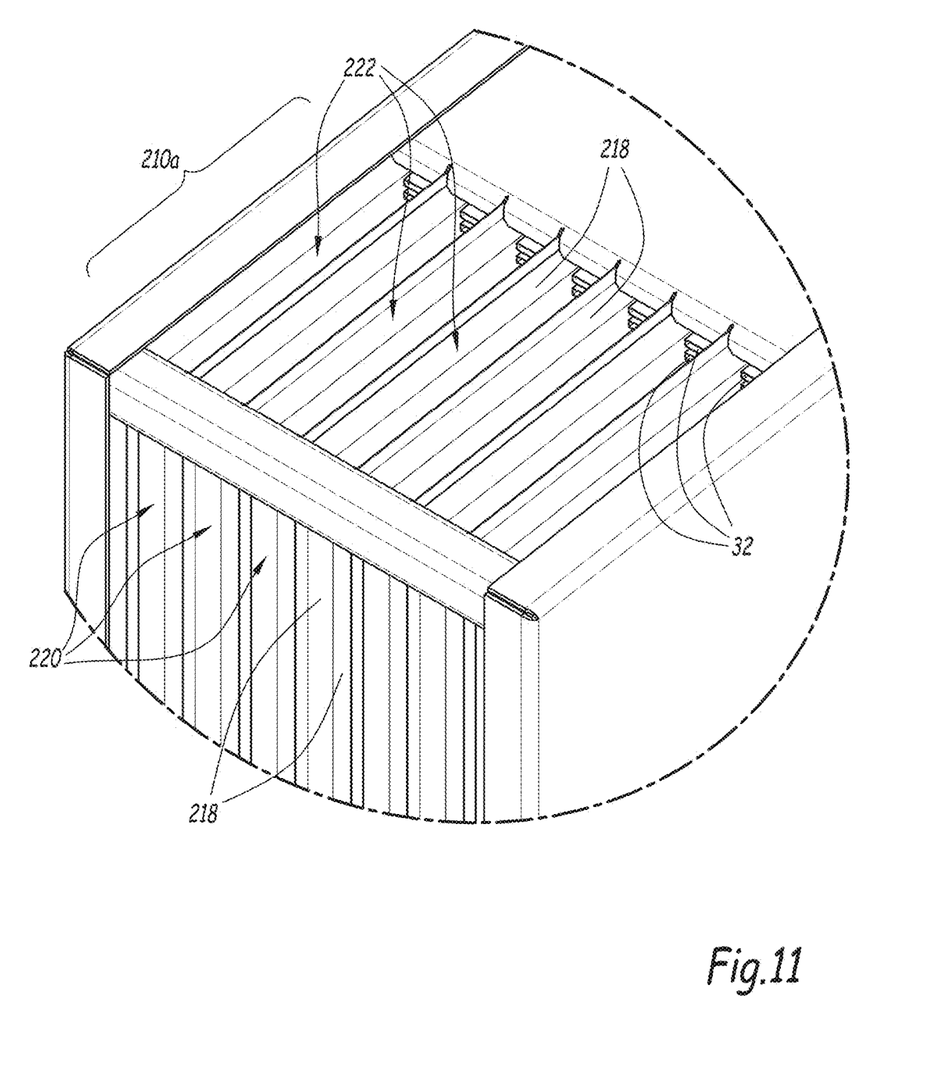
FIG. 11 is an enlarged view of detail XI of FIG. 10.

The exchanger 200 comprises a central block 210 comprising an exchange compartment 212 formed by the first network of channels 31 and the second network of channels 32, which are visible in FIG. 11. The central block 210 is placed in the exchanger 200 obliquely such that the airflows F1 and F2 circulate in the oblique directions in the central block 210. In the exchange compartment 212, the channels 31 and 32 are oriented in an oblique direction X200.

Figure 7:
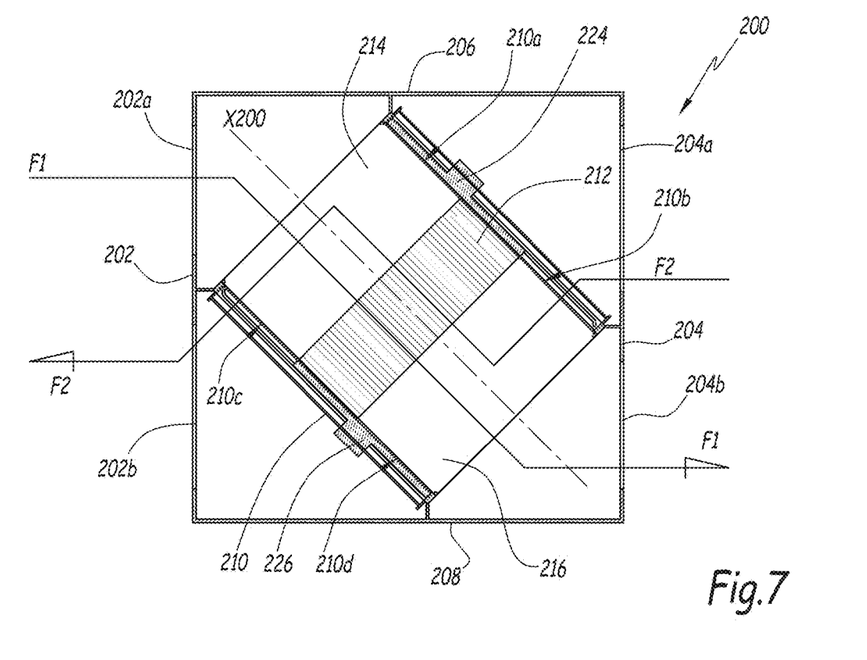
FIGS. 7, 8 and 9 are side views of an exchanger according to a third embodiment of the invention in the first, second and third operating configurations.
Figure 8:
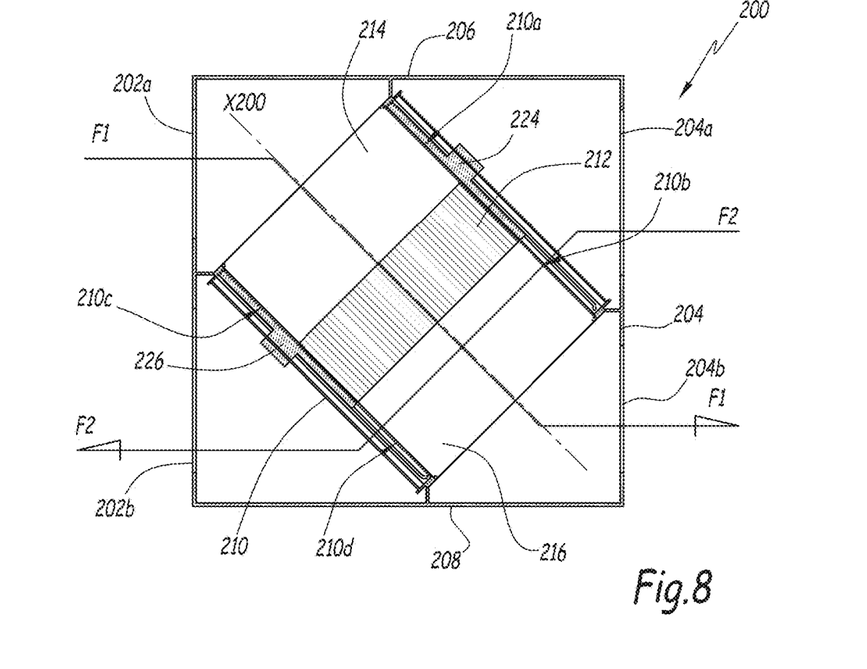
Figure 9:
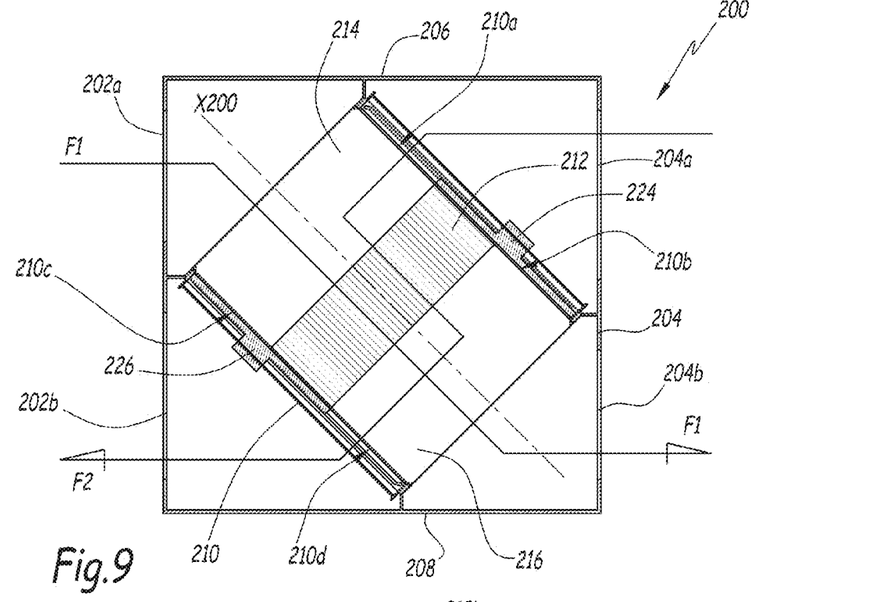
Figure 10:
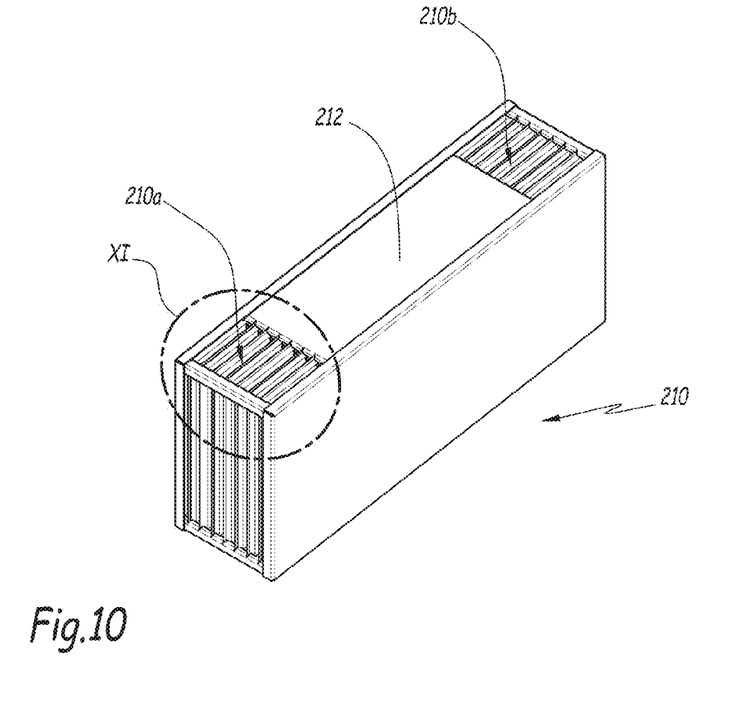
FIG. 10 is a perspective view of a central part of the exchanger of FIGS. 7 to 9.

On either side of the exchange compartment 212 in the direction X200, the central block comprises two end sections 214 and 216 made up of plates 218 parallel to one another and parallel to the plane of FIGS. 7 to 9. These plates 218 define open spaces 220 on the side of the inlet 202a and the outlet 204b to form a pathway suitable for the circulation of the first airflow F1 in the exchanger via the exchange compartment 212.

The central block 210 comprises openings 210a and 210b for the inlet of the second airflow F2 in the central block 210, which allow the communication between the end sections 214 and 216 with the opening 204b. On the side of the opening 204b, the plates 218 define open spaces 222 on the side of the inlet 204a suitable for the circulation of the second airflow F2. The spaces 220 and 222 alternate such that the airflows F1 and F2 circulate in offset planes.

Similarly, the central block 210 comprises outlet openings 210c and 210d of the second airflow F2 in the central block 210, which allow the communication between the end sections 214 and 216 of the opening 202b. The spaces 222 open on the side of the opening 202b such that the airflow F2 can leave the exchanger 200 after its passage in the central block 210. The openings 210a and 210b are aligned with the openings 210c and 210d in a direction perpendicular to the direction X200. The openings 210a and 210c are situated upstream from the exchange compartment 212 relative to the circulation direction of the first airflow F1, while the openings 210b and 210d are situated downstream from the exchange compartment 212 relative to the circulation direction of the first airflow F1.

The spaces 220 are open only on the side of the openings 202a and 204b and are closed on the side of the openings 204a and 202b.

The exchanger 200 comprises flaps 224 and 226 making it possible to steer the second airflow F2. The flap 224 is translated along the direction X200 between a first position, in which the flap 224 closes off the opening 210a but leaves the opening 210b available, and a second position in which it leaves the opening 210a available and closes off the opening 210b. The flap 226 is translated along the direction X200 between a first position, in which the flap 226 closes off the opening 210d but leaves the opening 210c available, and a second position in which it leaves the opening 210d available and closes off the opening 210c.

Thus, when the flaps 224 and 226 are in the first position, the second airflow F2 enters the central block through the opening 210b perpendicular to the direction X200, through the end section 216, as shown in FIG. 7. The second airflow F2 next passes in the exchange compartment 212, then leaves the central block 210 by the opening 210c. The opening 210b being downstream from the exchange compartment 212 while the opening 210c is upstream therefrom, one obtains a normal operating configuration of the exchanger 200, in which the airflows F1 and F2 circulate counter-currently in the exchange compartment 212 to obtain a high heat exchange performance.

When the flap 226 is in the second position and the flap 224 remains in the first position, as shown in FIG. 8 in a second so-called "bypass" configuration, the second airflow F2 is bypassed outside the exchange compartment 212 and directly leaves the central block 210 through the opening 210d without passing in the exchange compartment 212. In this configuration, low-performance heat exchanges take place between the airflow F1 and the airflow F2 in the end section 216, between the spaces 220 and 222.

The flaps 224 and 226 form members for reversing the circulation direction of the second airflow F2 in the exchanger 200, suitable for protecting the exchanger 200 from ice. Indeed, in a third configuration shown in FIG. 9, the second airflow F2 enters the central block 210 through the opening 210a and leaves it through the opening 210d. The opening 210a being upstream from the exchange compartment 212 and the opening 210d being downstream therefrom, the second airflow F2 therefore enters the exchange compartment 212 in the same direction as the first airflow F1, or "co-current", which makes it possible to limit the heat exchanges between the airflows F1 and F2 in order to prevent one of the flows from reaching an excessively low temperature and causing icing of the exchanger 200.

According to one embodiment that is not shown, the flaps 224 and 226 can be replaced by other types of members for reversing the flow direction of the second airflow F2 able to close off and make available the openings 210a, 210b, 210c and 210d, such as rotating flaps, gates or registers or any other appropriate members.

The invention claimed is:

1. A counter-current dual-flow air/air exchanger comprising:
    a first network of channels oriented along a longitudinal axis of the exchanger, for the circulation of a first airflow in a first direction along the longitudinal axis,
    a second network of channels oriented along the longitudinal axis of the exchanger, for the circulation of a second airflow in a second direction opposite the first direction of the first airflow along the longitudinal axis,
    means for protecting the exchanger from ice, the means for protecting the exchanger from ice comprising reversing members for reversing the flow direction of the second airflow in the second network of channels so that the second airflow is in the first direction such that the first and second airflows circulate concurrently in the first direction to thereby protect the exchanger from ice,
    a first inlet opening of the exchanger situated on one face of the exchanger, the first inlet opening for receiving the second airflow into the second network of channels, and
    a first outlet opening of the exchanger, the first outlet opening for discharging the second airflow and in fluid communication with an outlet of the second network of channels,
    wherein the reversing members for reversing the flow direction of the second airflow in the second network of channels comprise:
        a first bypass compartment, not comprising any heat exchange surface with the first network of channels, the first bypass compartment fluidly connecting the first inlet opening and the first outlet opening,
        a flow steering member that i) in a first position selectively steers the second airflow received in the first inlet opening toward the second network of channels and ii) in a second position selectively steers the second airflow received in the first inlet opening toward the first bypass compartment, and
        means for closing off the first outlet opening such that the second airflow passes, via openings, into the second network of channels after the second airflow passes through the first bypass compartment, wherein the first bypass compartment is in fluid communication with the second network of channels through the openings.

2. The exchanger according to claim 1, wherein the first inlet opening for the second airflow is situated on a first side of the one face of the exchanger and the first outlet opening for the second airflow is situated on a side of said one face of the exchanger opposite the first side.

3. The exchanger according to claim 1, wherein the means for closing off the first outlet opening for the second airflow comprise a flap mounted pivoting relative to a face of the exchanger in which the first outlet opening is arranged.

4. The exchanger according to claim 1, wherein the flow steering member in the first position that steers the second airflow toward the second network of channels, prevents passage of the second airflow in the first bypass compartment.

5. The exchanger according to claim 1, further comprising a second bypass compartment including an inlet fluidly communicating with the second network of channels on the side of the first inlet opening of the second airflow, and an outlet, forming a second outlet opening of the second airflow, near the first outlet opening of the second airflow.

6. The exchanger according to claim 5, further comprising a flap for closing off the second outlet opening of the second airflow.

7. The exchanger according to claim 5, wherein the flow steering member in the second position that steers the second airflow toward the first bypass compartment and then toward the second bypass compartment after the passage of the second airflow in the second network of channels, prevents the second airflow from leaving the exchanger through the first inlet opening.

8. The exchanger according to claim 5, wherein the flow steering member comprises separating means that, when the flow steering member is in the first position, prevents the passage of the second airflow into the first bypass compartment when the flow steering member steers the second airflow toward the second network of channels.

9. The exchanger according to claim 1, wherein the flow steering member is a valve rotatable along an axis perpendicular to the longitudinal axis of the exchanger.

10. The exchanger according to claim 1, further comprising a central block including an exchange compartment in which the first and second networks of channels are mounted, the central block comprising inlet and outlet openings for the second airflow in the central block situated upstream from the exchange compartment relative to the circulation direction of the first airflow in the exchange compartment, and inlet and outlet openings for the second airflow in the central block situated downstream from the exchange compartment relative to the circulation direction of the first airflow in the exchange compartment, and wherein the members reversing the flow direction of the second airflow open the inlet opening situated upstream and the outlet opening situated downstream such that the first and second airflows circulate concurrently.

11. The exchanger according to claim 10, wherein the reversing members are translatable flaps that close off and open, selectively, the inlet and outlet openings of the second airflow in the central block.

12. An air treatment apparatus, wherein comprises an exchanger according to claim 1, and wherein the second airflow is an airflow taken from a premises.

13. A method for protection against ice and cleaning of an exchanger according to claim 1, which comprises a step consisting of cleaning the network of channels in which the airflow most charged with particles flows; and reversing this airflow such that it flows in the same direction as the airflow least charged with particles.

* * * * *